(12) United States Patent
Singer

(10) Patent No.: US 6,773,743 B1
(45) Date of Patent: Aug. 10, 2004

(54) LOW CARBOHYDRATE SWEETENER

(76) Inventor: Michael Andrew Singer, 401 Happy Trail, San Antonio, TX (US) 78231

( * ) Notice: Subject to any disclaimer, the term of this patent is extended or adjusted under 35 U.S.C. 154(b) by 0 days.

(21) Appl. No.: 10/452,435

(22) Filed: Jun. 2, 2003

(51) Int. Cl.$^7$ ............................. A23G 9/00; A23L 1/22; A23L 3/3562

(52) U.S. Cl. ...................... 426/658; 426/565; 426/567; 426/519; 426/524

(58) Field of Search ................................ 426/658, 565, 426/567, 519, 524

(56) References Cited

U.S. PATENT DOCUMENTS

| | | | |
|---|---|---|---|
| 4,400,405 A | | 8/1983 | Morley et al. |
| 4,626,441 A | | 12/1986 | Wolkstein |
| 4,631,196 A | | 12/1986 | Zeller |
| 4,675,200 A | | 6/1987 | Serpelloni et al. |
| 4,911,946 A | | 3/1990 | Singer et al. |
| 5,215,777 A | | 6/1993 | Asher et al. |
| 5,246,725 A | | 9/1993 | Fisher et al. |
| 5,411,755 A | * | 5/1995 | Downton et al. ............ 426/599 |
| 5,433,965 A | * | 7/1995 | Fischer et al. .............. 426/548 |
| 5,527,554 A | | 6/1996 | Olinger et al. |
| 6,432,464 B1 | * | 8/2002 | Andersen et al. ........... 426/548 |
| 6,682,766 B2 | * | 1/2004 | Blumenstein-Stahl et al. ............. 426/590 |
| 2003/0165603 A1 | * | 9/2003 | Burklow et al. ............ 426/548 |
| 2003/0170365 A1 | * | 9/2003 | Huang ........................ 426/548 |
| 2004/0022913 A1 | * | 2/2004 | Watson et al. .............. 426/548 |
| 2004/0058050 A1 | * | 3/2004 | Guo ............................ 426/615 |

* cited by examiner

Primary Examiner—N. Bhat
(74) Attorney, Agent, or Firm—Albert Brent

(57) ABSTRACT

This invention pertains to a Low Carbohydrate, Low Glycemic Index, cane sugar-free sweetener comprising a synergistic mixture of Lo Han Quo, also referred to as Lo Han Kuo Extract and Sucralose Liquid for use in an improved tasting ice-cream or for sweetening baked goods and candy. The ice cream embodiment has less total carbohydrates per serving and 30% less fat and calories than conventional ice cream. The unflavored ice composition comprises the following in wt. %:

| Ingredients | Range | Best Mode |
|---|---|---|
| Lo Han Kuo Extract | 0.014–0.018 | 0.016 |
| Sucralose Liquid | 0.072–0.080 | 0.076 |
| CC305 | 0.200–0.270 | 0.235 |
| Glycerin | 0.900–1.100 | 1.000 |
| Polydextrose | 9.000–10.050 | 9.525 |
| Whey Protein Concentrate | 1.550–1.620 | 1.585 |
| Egg Yolk Solids | 2.000–3.500 | 2.750 |
| Non fat Dry milk Solids | 2.800–3.200 | 3.000 |
| Cream and Skim Milk | 83.454–80.162 | 81.813 |

18 Claims, No Drawings

LOW CARBOHYDRATE SWEETENER

BACKGROUND OF THE INVENTION

This invention pertains to a low carbohydrate, low glycemic index, cane sugar-free sweetener comprising Lo Han Quo Extract, also referred to as Lo Han Kuo Extract, and Sucralose Liquid for use in an improved tasting ice cream, or as a sweetener for baked goods and candy.

Prior art conventional ice creams are sweetened with about 7 to 29 wt. % of natural sugars i.e. cane sugar. They also contain about 10 wt. % or more of fats. Further, the total carbohydrate content of conventional ice cream is in the range of about 19 to 34 wt. %, and they have a glycemic index of about 68, or more. A standard portion of conventional ice cream i.e. ½ Cup or 65 grams, has a calorie content about 200 to 300. People suffering from diabetes or who have weight problems are advised by their medical doctors to avoid eating conventional ice cream because of the detrimental effect it may have on their health.

Prior art ice cream formulations in which natural cane sugar is replaced by artificial sweeteners generally suffer from after taste problems including bitter nuances. Further, they lack the clean taste, palatability, firmness, melting, and overrun properties of the subject invention comprising a unique mixture of ingredients including a synergistic combination of non-nutritive sweeteners.

A sugar-less ice cream formula is described in U.S. Pat. No. 4,675,200. While the ice cream product in said patent contains no sucrose, dextrose, fructose, or glucose, the sweetening and texture forming agent comprises polyols. There are no such materials in the cane sugar-free sweetener of the subject invention. U.S. Pat. No. 4,626,441 substitutes Aspartame (phenylketone) for conventional sweeteners, either alone or in admixture with a sweetener and a bulking agent. The unobvious and synergistic mixture of sweeteners present in the subject invention are not found in said references, nor in any other ice cream. Further, the improved taste and spoonability, along with low total carbohydrates per serving, are unique with the ice-cream of the subject invention.

BRIEF SUMMARY OF THE INVENTION

The subject sweetener comprising a synergistic mixture of Lo Han Quo Extract and Sucralose Liquid is used to produce a unique low carbohydrate ice cream that is free from cane sugar. The Total Carbohydrate content of the ice cream is less than 16.1 wt. %, such as 13.6 wt. %, and the reduced calorie content is less than 1.8 calories per gram, such as 1.0 calorie per gram. The ice cream has an improved, clean, smooth taste and excellent spoonability. Softened ice cream product will become firm on being refrozen without the formation of ice crystals and without the loss of its excellent palatability and spoonability. A small synergistic amount of sweetener comprising about 0.014 to 0.018 wt % of Lo Han Kuo Extract and about 0.072 to 0.080 wt % of Sucralose Liquid is incorporated in the ice cream. This amount converts to a weight ratio of Lo Han Kuo Extract/Sucralose Liquid in the range of about 0.19 to 0.23, such as about 0.21. Unexpectedly, a mixture of these two sweeteners in said weight ratio provides the ice cream product with an improved sweet, clean taste with no after taste. Small amounts of Glycerin (0.900 to 1.100 wt %) and CC305 (0.230 to 0.270 wt %) are included to emulsify and stabilize the product. Cream and skim milk are included to provide an overall butterfat content in the range of about 8.5–9.5 wt. %.

Further, there are no vegetable oils, natural cane sugar or sugar alcohol, which are ordinarily found in conventional ice cream, in the subject ice cream product.

In another embodiment, the same synergistic weight ratio of Lo Han Quo Extract/Sucralose Liquid as in the improved ice cream i.e. 0.21 is used as the sweetening agent in the manufacture of baked goods i.e. cake, and in candy.

It is therefore an object of the present invention to provide an improved cane sugar-free sweetener comprising a synergistic mixture of Lo Han Kuo Extract and Sucralose Liquid for use in a low carbohydrate ice cream, and in baked goods and candy.

Yet another object of the present invention is to provide a natural sugar-free ice cream, which in comparison with conventional ice creams has improved taste, overrun properties, melting rate, hardness, palatability and spoonability.

DETAILED DESCRIPTION OF THE INVENTION

The improved sweetener comprises in weight percent:

| | |
|---|---|
| Lo Han Kuo Extract | 16.3–18.4, say about 17.4 |
| Sucralose Liquid | 83.7–81.6, say about 82.6 |

It was unexpectedly found that by the addition of a small amount of Lo Han Kuo Extract to Sucralose Liquid, the amount of Sucralose Liquid used to obtain the same sweetening effect of a tea spoon full of natural cane sugar may be considerably reduced. For example, the amount of Sucralose Liquid in the cane sugar free ice-cream mixture to be further described below, may be reduced from about 0.15 grams/100 grams of ice cream product to 0.075 grams/100 grams of ice-cram product, by adding about 0.016 grams of Lo Han Kuo Extract. This is unexpected because Lo Han Kuo Extract is a less potent sweetener than Sucralose. Sucralose has a sweetening effect of about 600 times that of cane sugar, whereas Lo Han Kuo Extract has a sweetening effect of about 200 times that of cane sugar. Lo Han Kuo Extract and Sucralose Liquid will be further described below in connection with its preferred use in low carbohydrate ice cream.

An embodiment of the present invention is shown in Example 1 below, along with the preferred range and best mode for the ingredients in wt % for the improved low carbohydrate unflavored cane sugar-free ice cream having greater stability, palatability, and texture.

EXAMPLE 1

| Ingredients | Range | Best Mode |
|---|---|---|
| Lo Han Kuo Extract | 0.014–0.018 | 0.016 |
| Sucralose Liquid | 0.072–0.080 | 0.076 |
| CC305 | 0.200–0.270 | 0.235 |
| Glycerin | 0.900–1.100 | 1.000 |
| Polydextrose | 9.000–10.050 | 9.525 |
| Whey Protein Concentrate | 1.550–1.620 | 1.585 |
| Egg Yolk Solids | 2.000–3.500 | 2.750 |
| Non fat Dry milk Solids | 2.800–3.200 | 3.000 |
| Cream and Skim Milk | 83.454–80.162 | 81.813 |

The superiority of the present invention over other ice creams may be best shown by a tasting. It has an American Dairy Science Association standardized control panel of four to five. Conventional ice creams have a value of three at which point one can feel ice crystals in his or her mouth. Further a comparison of carbohydrates and calorie content readily show the advantages of the subject invention. Basis a serving size of one half cup or 62 grams, conventional ice cream containing natural sugars i.e. dextrose, levulose and glucose contain total carbohydrates in the range of about 19 to 38 wt %, a calorie content in the range of about 200 to 300, and a glycemic index of over 68. In comparison, the improved subject ice cream has a maximum total carbohydrate content of 13.6 wt %, a milk fat content of less than 1.2 wt %, and a maximum calorie content of 1.8 calorie/gram.

The glycemic index of the subject ice-cream is in the range of 31 to 34. The glycemic index refers to the amount of insulin released by a given carbohydrate in reference to a standard such as sucrose or white bread. By being low glycemic, less insulin is released and less glucose is converted to adipose tissue i.e. fat. The glycemic indices of Lo Han Kuo Extract and Sucralose Liquid artificial sweeteners are less than those of glucose and sucrose. Since the inventive product is low glycemic, its use may be considered by diabetics and those who are trying to lose weight.

Low Han Kuo Extract is a Mogroside sweetener made from Momordica fruit and is a product of China Natural Products Group Inc. Saint Louis Mo. It is provided as a powdered extract containing at least 80 wt % of Mogroside. The remainder comprises water, ash, and fiber. It has a particle size of NLT 90% through 80 mesh. Sucralose Liquid comprises an aqueous solution of sucralose micronized powder in the amount of 24.5 to 25.6 wt. %. The liquid concentrate is buffered to a Ph of 4.4 with sodium citrate/citric acid and preserved with potassium sorbate and sodium benzoate. Sucralose has the chemical formula of $C_{12}H_{19}O_8Cl_3$. It is manufactured by "Mc Neil ". A comparatively small amount of the unique combination of sweeteners in the invention gives the ice cream a clean sweet taste. This is without the aftertaste that is commonly found with other sugar substitutes. The percentage and ratio of our combination of artificial sweeteners provides a synergistic sweetening without side effects.

CC305 (stabilizer) is introduced into the subject ice cream in the range of about 0.200–0.270 wt %. It is produced by "Continental Colloid Corporation", West Chicago, Ill. This stabilizer helps to maintain the shelf life and overrun features of the ice cream product. It functions as a water binding and gelling agent. It controls the crystallization of the water in the ice cream mix, by binding with a portion of the water and preventing the formation of water crystals in the ice cream. The effect of low temperatures in the freezing and storing stages is thereby minimized even when the ice cream is melted and then refrozen. Smoothness and palatability of the product is thereby improved and maintained. This product comprises a mixture of Carragenan (Seaweed Extract), Guar Gum and Locust Bean Gum, for example equal parts of each.

Glycerin in the amount of 0.900 to 1.100 wt % is included as an emulsifier and to provide a smooth tasting ice cream with proper body and texture. It controls the degree of emulsification of the ice cream product and restricts the formation of ice crystals.

Polydextrose is included in the ice cream mix in the amount of 9.000 to 10.050 wt. %. It serves as a palatable bulking agent providing body and texture. Polydextrose is derived from sugar; but, it is not sugar and it is not sweet. Polydextrose is available as STA-LITE III from "Pfizer Chemical and Pharmaceutical Company". It has one calorie/gram, a number average molecular weight between about 1550 to 1750 and is highly branched. Polydextrose is not digested but excreted from the body. Accordingly, it is not classified as a carbohydrate or sugar. It has no diabetic effect on blood sugar.

Whey Protein Concentrate is present in the range of about 1.550 to 1.620 wt. %. Whey protein Concentrate is a byproduct of cheese making and contains about 80 wt. % protein. It binds water.

Egg Yolk Solids in the range of about 2.000 to 3.500 wt. % is present as an emulsifier and to impart smoothness and flavor. This material comprises in wt. %, moisture about 3.5, fat about 56, protein about 13 and carbohydrate about 10.

Non Fat Dry Milk Solids are present in the amount of about 2.800 to 3.200 wt. % to provide solids and flavoring. It is obtained by driving off all of the water from the milk. It comprises in wt. %, protein about 34.9, fat about 0.58 and the remainder lactose.

Cream from cow milk and Skim cow milk are provided in the total amount of about 83.464–80.162 wt. %. The total of these two ingredients provide an overall butter fat content in the range of about 8.0 to 9.5 wt. %. Depending on their butter fat content, for example, cream may be present in the range of about 26.734 to 15.302 wt. % and skim milk in the range of about 56.730 to 64.860 wt. %. The skimmed cow milk is a suspension agent and provides body and flavor.

Skim milk has a butterfat content of less than 1.0 wt. %, and cream has butterfat content in the range of about 30 to 42 wt. %.

Flavoring may be added to the basic ice cream mix in an amount in the range of about 18 to 85 ml of flavoring per gallon of basic ice-cream mix, for example as follows:

Vanilla-2 fold Bourbon vanilla extract of Lochead Vanilla-75–85 ml/gal basic ice-cream mix.

Chocolate-Hershey's European Cocoa powder-87–89 gms/gal unpasteurized basic ice-cream mix.

Almond-VanLab #9968 Almond Flavor-18–22 ml/gallon of basic ice-cream mix.

Coffee-VanLab #9969 Coffee Flavor-72–76 ml/gallon of basic ice-cram mix.

Low microbial counts for the flavored ice-cream is shown in Table 1 below. Colony forming unit is designated by the term cfu, and standard plate count is represented by the term SPC.

TABLE 1

Microbial Counts for Flavored Ice Cream

| Flavor | Coliform cfu/ml | SPC cfu/ml | Yeast & Mold 3 day cfu/ml |
|---|---|---|---|
| Vanilla | <1 | 110 | <1 |
| Chocolate | <1 | 70 | <1 |
| Almond | <1 | 70 | <1 |
| Coffee | <1 | 100 | <1 |

In another embodiment, the same synergistic weight ratio of Lo Han Quo Extract/Sucralose Liquid i.e. about 0.21 is used to replace the sweetening agent in the manufacture of baked goods i.e. cake, and to make candy. In the manufacture of cane sugar-free baked goods i.e. cake and candy, the amount of Sucralose is thereby reduced while the taste is improved.

METHOD OF PREPARATION

The preparation of the ice cream product in accordance with the present invention employs conventional processing equipment including a mixer pasteurizer, homogenizer, and freezer. The ingredients are weighed out and added to the skim milk held at a temperature in the range of about 88–120° F., say about 100° F. with intermittent stirring. At this time, there is no whipping of air into the product. The ingredients are added to and dissolve in the warm milk in the following order: (1) Whey Protein Concentrate, (2) Nonfat Dry Milk, (3) Egg Yolk Solids, (4) Polydextrose, (5) Glycerine, (6) CC305 and (7) Lo Han Kuo Extract mixed with Sucralose Liquid.

With the addition of Cream, the unflavored basic ice cream mix is pumped through a high temperature short time (HTST) pasteurizer. There its temperature is raised to about 180° F. for a holding period in the range of about 60–80 seconds so as to kill all of the pathogenic organisms and to activate the ingredients.

The pasteurized ice cream mix is then put through two stages of homogenization within 8–12 seconds. To make chocolate ice cream, cocoa powder is added to the ice cream mix prior to homogenization. A Gaylan homogenizer may be used. The first homogenization stage takes place at a temperature in the range of about 115–125° F., say about 120° F. and a pressure in the range of about 475–525 pounds per square inch (psi), say about 500 psi. The second stage takes place immediately after the first stage at a temperature in the range of about 115–125° F., say about 120° F. and a pressure in the range of about 1235–1365 psi. say about 1300 psi. After homogenization, the ice cream mix is stored in a holding tank for about 12–48 hrs. say about 30 hrs. at a temperature in the range of about 40–45° F. say about 42° F., and at atmospheric pressure.

From the holding tank the ice cream mix is passed through a continuous freezer where it is cooled to a temperature in the range of about 26 to 30° F. say about 28° F. while it is aerated and whipped so that its volume is increased in the range of about 80–110 volume percent, such as about 90–100 volume %, and preferably 100 volume percent or more.

This increase in volume of the ice cream is also referred to as overrun. For example, an ice cream product leaving the freezer with double the volume that it had when it entered the freezer has and overrun of 100%. In order to obtain the desired product in terms of texture, mouth feel and smoothness, a 100% overrun is desired.

All flavors with the exception of chocolate are introduced into the ice cream mix immediately prior to entering the continuous freezer. On the other hand, chocolate flavor is incorporated in the ice cream mix before the pasteurization stage.

Various modes of carrying out the invention are contemplated as being within the scope of the following claims, particularly pointing out and distinctly claiming the subject matter which is regarded as the invention.

I claim:

1. A low carbohydrate sweetener comprising the following ingredients in wt. %

| Ingredient | Range |
| --- | --- |
| Lo Han Kuo Extract | 16.3–18.4, |
| Sucralose Liquid | 83.7–81.6, |

2. The sweetener of claim 1, wherein said Lo Han Kuo Extract is provided as a powder comprising at least 80 wt. % of Mogroside, and said Sucralose Liquid is an aqueous solution comprising about 24.5 to 25.6 wt % of Sucralose powder, and said Sucralose has the chemical formula of $C_{12}H_{19}O_8Cl_3$.

3. The sweetener of claim 1 for providing sweetening for a product selected from the group consisting of ice-cream, baked goods, and candy.

4. A low carbohydrate sweetener according to claim 1 comprising 17.4 wt % Lo Han Kuo extract and 82.6 wt % of sucralose liquid.

5. A low carbohydrate unflavored basic ice-cream composition comprising the following ingredients in wt. %:

| Ingredients | Range | Best Mode |
| --- | --- | --- |
| Lo Han Kuo Extract | 0.014–0.018 | 0.016 |
| Sucralose Liquid | 0.072–0.080 | 0.076 |
| CC305 | 0.200–0.270 | 0.235 |
| Glycerin | 0.900–1.100 | 1.000 |
| Polydextrose | 9.000–10.050 | 9.525 |
| Whey Protein Concentrate | 1.550–1.620 | 1.585 |
| Egg Yolk Solids | 2.000–3.500 | 2.750 |
| Non Fat Dry milk Solids | 2.800–3.200 | 3.000 |
| Cream and Skim Milk | 83.464–80.162 | 81.813 |

6. A low carbohydrate unflavored basic ice cream composition according to claim 5, comprising the following ingredients: 0.016 wt % Lo Han Kuo extract, 0.076 wt % sucralose liquid, 0.235 wt % CC305 stabilizer, 1.000 wt % glycerin, 9.525 wt % polydextrose, 1.585 wt % whey protein concentrate, 2.750 wt % egg yolk solids, 3.000 wt % non-fat dry milk solids, 81.813 wt % cream and skim milk.

7. The ice cream composition of claim 5, wherein said Lo Han Kuo Extract comprises at least 80 wt. % Mogroside made from Momordica fruit, said Sucralose Liquid is an aqueous solution comprising 24.5–25.5 wt. % of Sucralose micronized powder having the chemical formula of $C_{12}H_{19}O_8Cl_3$, and a CC305 stabilizer comprising a mixture of Carragenan, Guar Gum and Locust Bean Gum.

8. The ice cream composition of claim 5, containing flavoring in the amount of about 18–85 ml per gallon of ice cream.

9. The ice cream composition of claim 5, containing Almond flavoring in the amount of 18–22 ml/gallons of ice cream.

10. The ice cream composition of claim 5, containing Coffee flavoring in the amount of 72–76 ml/gallons of ice cream.

11. The ice cream composition of claim 5, containing chocolate in the amount of about 87–89 grams of cocoa powder per gallon of ice cream.

12. The ice cream composition of claim 5, wherein said Cream and Skim Milk provide a total butterfat content in the amount of 8.0 to 9.5 wt. %, said Cream is present in the amount of about 26.73 to 15.30 wt. %, and said Skim Milk is present in the amount of about 56.73 to 64.86 wt. %.

13. The ice cream product of claim 5, containing Vanilla Extract in the amount of 75–85 ml per gallon of ice cream.

14. The ice cream composition of claim 5 having an overrun in the range of about 80–110 volume %.

15. The ice cream composition of claim 5 having a Total Carbohydrate content of less than 16.1 wt. %, and a calorie content of less than 1.8 calories per gram.

16. The ice cream product of claim 5 having a Glycemic Index of less than 34.

17. The process of making low carbohydrate unflavored ice cream comprising:

1) introducing into Skim Milk at a temperature in the range of about 88–120° F. the following ingredients to produce a basic ice cream mix: Whey Protein Concentrate, Nonfat Dry Milk Solids, Egg Yolk Solids, Polydextrose, Glycerin, CC305, Lo Han Kuo Extract and Sucralose Liquid, and Cream wherein said Lo Han Kuo Extract is a Mogroside sweetener made from Momordica fruit and is provided as powdered extract comprising at least 80 wt. % Mogroside and in the amount of about 0.014 to 0.018 wt %, and the Sucralose in said Sucralose Liquid has the chemical formula of $C_{12}H_{19}O_8Cl_3$, and said Sucralose Liquid is provided in the amount of about 0.072 to 0.080 wt %, and a CC305 stabilizers comprising a mixture of Carragenan, Guar Gum and Locust Bean Gum and is provided in the amount of about 0.230 to 0.270 wt %;

2) pasteurizing the basic ice cream mix from (1) at a temperature of about 180° F. for about 60–80 seconds;

3) Homogenizing the pasteurized ice cream mix from (2) in two stages within 8–12 seconds, wherein the first stage takes place at a temperature in the range of about 115–125° F. and a pressure in the range of about 475–525 psi and the second stage takes place at a temperature in the range of about 115–1250° F. and a pressure in the range of about 1235–1365 psi.;

4) holding the homogenized ice cream mix from (3) at a temperature in the range of about 40–45° F. at atmospheric pressure for about 12 to 48 hours: and, 5) cooling the ice cream mix from (4) to a temperature in the range of about 26 to 30° F. while aerating and whipping, thereby producing ice-cream with a volume increase in the range of about 80–110% in comparison with said basic ice cream mix from step (4).

18. The process of claim 17 provided with the step of mixing a flavor other than chocolate with the homogenized ice cream from step (3); or alternatively for chocolate flavor, mixing cocoa powder with the basic ice cream mix from step (1).

* * * * *